United States Patent [19]
Nakamura

[11] Patent Number: 5,430,501
[45] Date of Patent: Jul. 4, 1995

[54] COMPACT VIDEO PROJECTOR

[75] Inventor: Koji Nakamura, Nagaokakyo, Japan

[73] Assignee: Mitsubishi Denki Kabushiki Kaisha, Tokyo, Japan

[21] Appl. No.: 246,462

[22] Filed: May 18, 1994

Related U.S. Application Data

[63] Continuation of Ser. No. 20,601, Feb. 22, 1993, abandoned.

[30] Foreign Application Priority Data

Mar. 12, 1992 [JP] Japan .................. 4-053597

[51] Int. Cl.6 .................. H04N 9/31; H04N 9/16; H04N 9/18
[52] U.S. Cl. .................. 348/744; 348/757; 348/780
[58] Field of Search .......... 348/744, 747, 756, 757, 348/779, 780, 781, 787, 789, 745, 785; H04N 9/31, 9/16, 9/18

[56] References Cited

U.S. PATENT DOCUMENTS

| 4,473,840 | 9/1984 | Miyatake | 358/60 |
| 4,578,710 | 3/1986 | Hasegawa | 358/60 |

FOREIGN PATENT DOCUMENTS

| 0056307 | 7/1982 | European Pat. Off. | |
| 0275601 | 7/1988 | European Pat. Off. | |
| 3901101 | 7/1990 | Germany | |
| 125791 | 6/1987 | Japan | H04N 9/31 |
| 2191057 | 12/1987 | Japan | H04N 9/31 |
| 290391 | 11/1990 | Japan | H04N 9/31 |
| 5165121 | 6/1993 | Japan | 348/744 |

Primary Examiner—James J. Groody
Assistant Examiner—Glenton B. Burgess
Attorney, Agent, or Firm—Birch, Stewart, Kolasch & Birch

[57] ABSTRACT

A projector is provided with three CRTs, a mirror system, and a projection lens. The three CRTs radiating light beams of colors different from one another are arranged such that respective tube axes thereof exist on the same plane. The mirror system includes dichroic mirrors for reflecting the light beams of the respective colors from the CRTs in a direction perpendicular to the above plane. The mirror system is arranged at front sides of the CRTs. The projection lens is arranged on an optical path of the reflected light beam from the mirror system so as to combine the reflected light beams of the respective colors and to project the combined light beam onto the screen. The thus constructed projector has a short depth since the light beams from the respective CRTs are projected in the direction perpendicular to the above plane by the dichroic mirrors of the mirror system.

14 Claims, 8 Drawing Sheets

COMPACT VIDEO PROJECTOR

This application is a continuation of application Ser. No. 08/020,601, filed on Feb. 22, 1993, now abandoned.

BACKGROUND OF THE INVENTION

1. Field of the Invention

This invention relates to a projector for projecting a video image onto a screen using a plurality of image forming apparatuses such as a cathode ray tube (hereinafter referred to as a CRT) and a liquid crystal display.

2. Description of Related Art

Figure 1:
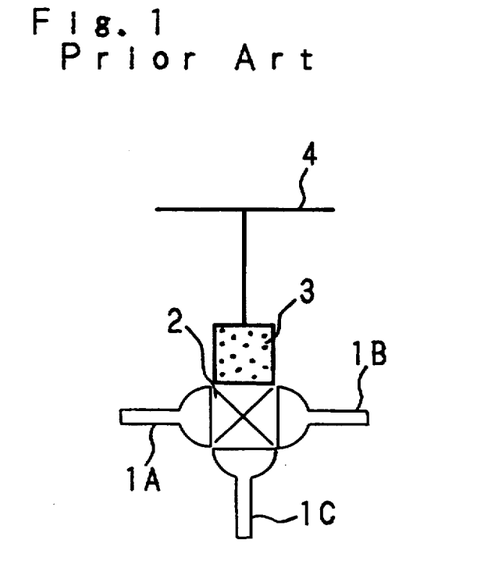
FIG. 1 is a schematic plan view showing a conventional projector of the 3CRT-1 lens system.

A conventional projector of this type is known the one shown in FIG. 1. This projector is of the so-called 3CRT-1 lens system. In this figure, indicated at 1 (1A, 1B, 1C) are three CRTs. The respective CRTs 1A, 1B, 1C are fabricated for blue, red, and green colors, and all the colors are produced by these three CRTs. Indicated at 2 are dichroic mirrors for reflecting light beams from the CRTs 1, at 3, which is a lens system arranged on an optical path of the reflected light beams from the dichroic mirrors 2, and at 4 a screen. In the front type projectors, the CRTs 1, dichroic mirrors 2, and lens system 3 are constructed integrally. On the other hand, in the rear type projectors, all the elements including the screen 4 are constructed integrally.

There will be next described an operation of thus constructed projector. The respective color light beams from the three CRTs 1A, 1B, 1C are reflected by the two dichroic mirrors 2 utilizing a wavelength selecting property thereof, are incident upon the lens system 3 along the same axis as an optical axis, and are projected onto the screen 4 from the lens system 3.

Figure 2:
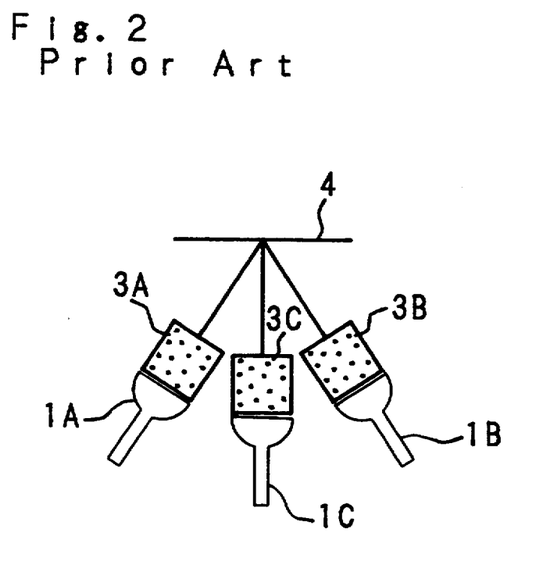
FIG. 2 is a schematic plan view showing a conventional projector of the 3CRT-3 lens system.

A projector shown in FIG. 2 is of the so-called 3CRT-3 lens system. In this projector, three lens systems 3 (3A, 3B, 3C) are arranged in correspondence with the CRTs 1A, 1B, 1C.

Figure 3:
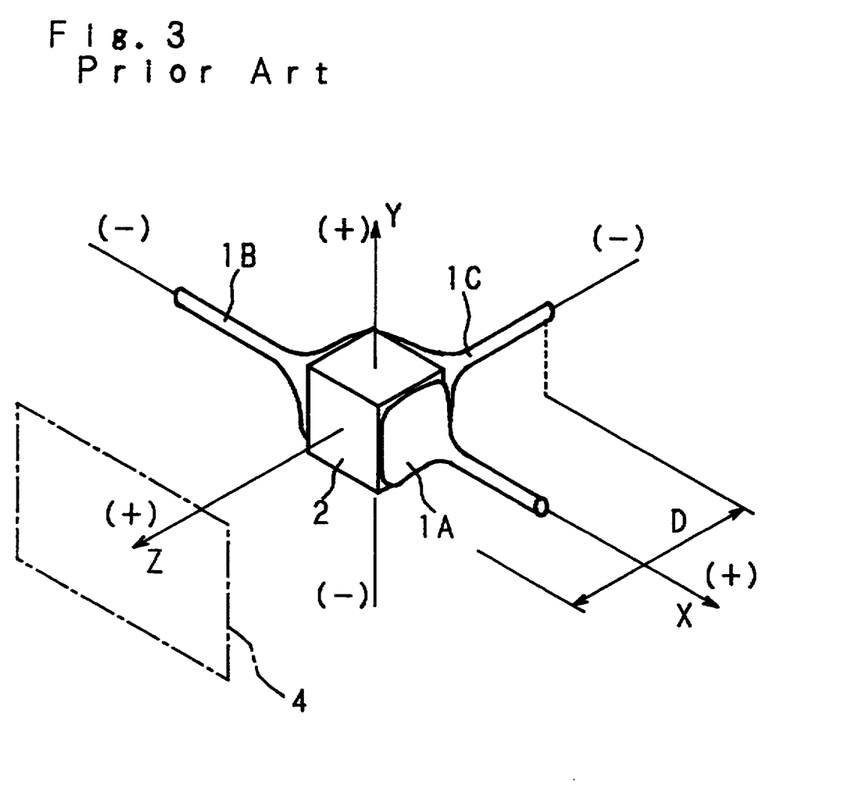
FIG. 3 is a schematic construction diagram showing a spatial relationship of CRTs in FIG. 1.

A spatial relationship between the CRTs 1A, 1B, 1C and the screen 4 of the projector shown in FIG. 1 is shown diagrammatically in FIG. 3. If it is assumed that a direction extending from the CRTs 1 to the screen 4 is a Z-axis, an X-axis exists coplanarly with the Z-axis, and a Y-axis exist on a plane perpendicular to an X-Z plane, tube axes of the CRTs 1A, 1B, 1C (center axes of necks) exist on the X-Z plane and the screen 4 is arranged along the X-Y plane (in reality, the screen 4 may be inclined slightly relative to the X-Y plane).

In the projector of the 3CRT-3 lens system shown in FIG. 2, the CRTs 1A, 1B, 1C are arranged on the X-Z plane and the screen 4 is arranged along the X-Y plane.

The conventional projectors are constructed as described above. Since the CRTs 1A, 1B, 1C are arranged on the X-Z plane perpendicular to the plane of the screen 4, a depth D (D1) of the projector in the direction extending toward the screen 4 increases. Particularly, since the axial length of the CRTs themselves is relatively large, an increase in the depth D (D1) becomes prominent, thereby standing as a hindrance to a smaller size projector.

Figure 4:
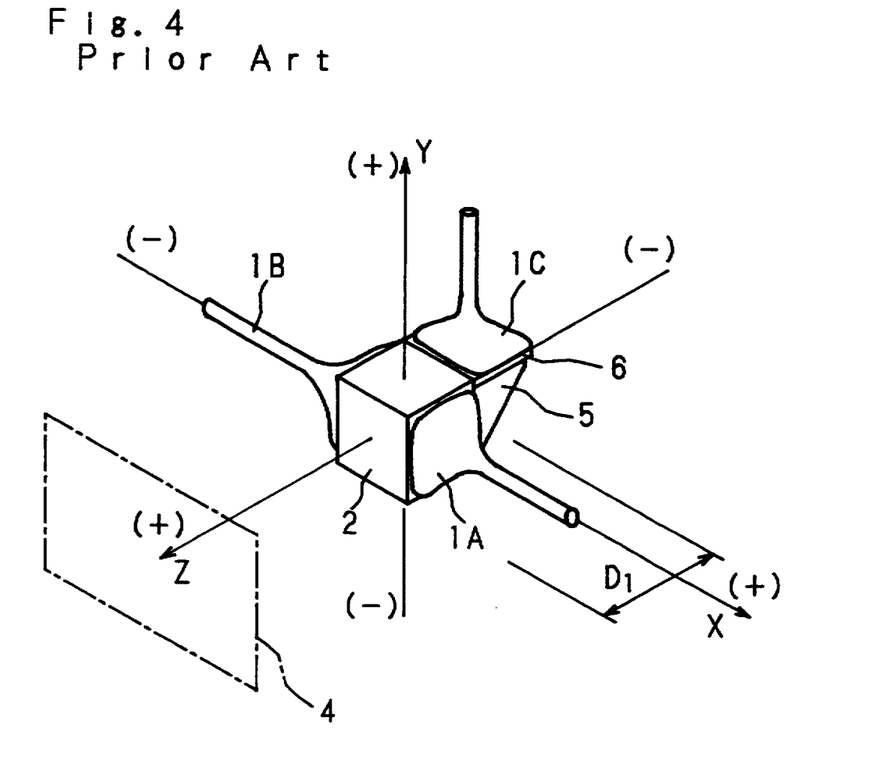
FIG. 4 is a schematic construction diagram showing another conventional projector of the 3CRT-1 lens system.

In view of the above problems, there has been developed a projector as an improvement of the 3CRT-1 lens system in which the tube axis of the CRT 1C is arranged along the Y-axis and the light beam therefrom is reflected by a mirror 5 as shown in FIG. 4. However, this case requires such a special optical path correcting lens 6 as to correct a difference between the optical paths of the CRTs 1A and 1B relative to the CRT 1C, making the construction of the projector complicated.

SUMMARY OF THE INVENTION

A main object of the present invention is to provide a projector which can be produced in a smaller size without using an optical path correcting lens or the like.

A projector according to the invention comprises three CRTs radiating light beams of colors different from one another and arranged such that respective tube axes thereof exist on the same plane, a mirror system including dichroic mirrors for reflecting light beams of the respective colors from the CRTs in a direction perpendicular to the plane, the mirror system being arranged at front sides of the CRTs, and a projection lens arranged on an optical path of the reflected light beam from the mirror system for combining the reflected light beams of the respective colors and projecting the combined light beam onto the screen. Since the light beams from the respective CRTs are projected in the direction perpendicular to the above plane by the dichroic mirrors of the mirror system, the depth of the projector can be reduced and an optical path correcting lens or the like is not required.

It is possible to emit the light beam reflected by the mirror system in a direction along the above plane and to reflect the light beam by the use of another mirror. With this arrangement, the invention can be easily embodied into a rear type projector.

Further, liquid crystal displays may be used in place of the CRTs. With the use of the liquid crystal displays, the depth of the projector can be further shortened.

The above and further objects and features of the invention will more fully be apparent from the following detailed description with accompanying drawings.

DESCRIPTION OF THE PREFERRED EMBODIMENTS

Hereafter, the invention will be described in detail with reference to the drawings illustrating embodiments thereof.

Figure 5:
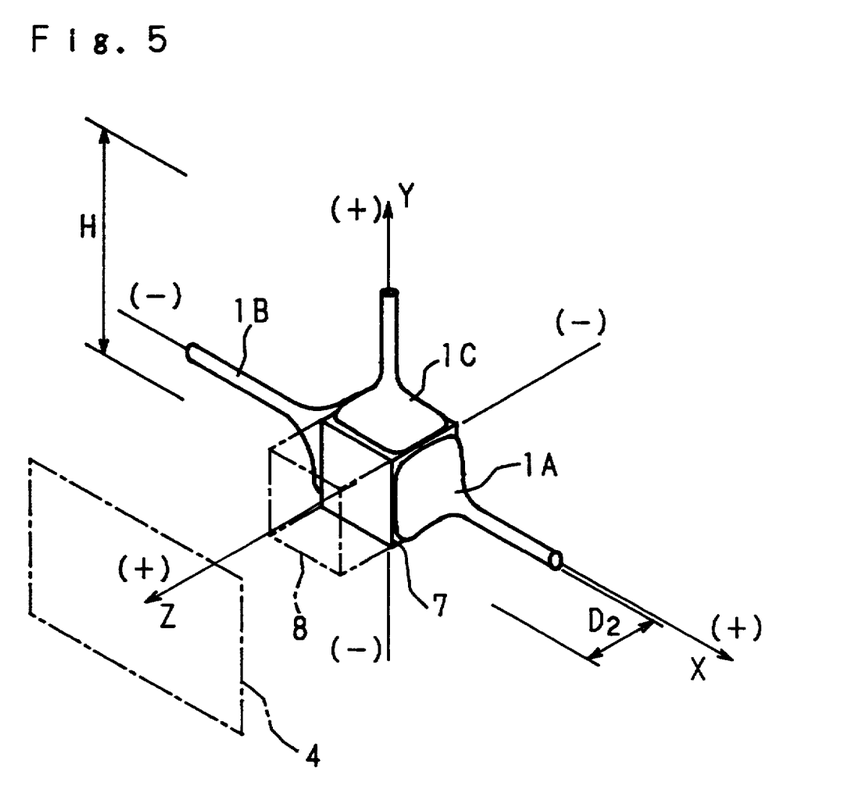
FIG. 5 is a schematic construction diagram showing a projector of 3CRT-1 lens system according to the invention.

FIG. 5 is a schematic construction diagram showing an example in which the invention is applied to a projector of the 3CRT-1 lens system. Like numerals designate like or corresponding parts of the aforementioned conventional projector, and description thereof is omitted.

In FIG. 5, respective tube axes of three CRTs 1A, 1B, 1C are positioned on the same plane, namely an X-Y plane (a plane along a plane of a screen 4). In other words, the CRTs 1A, 1B, 1C are arranged such that fluorescent screens thereof face −X direction, +X direction, and −Y direction respectively. A mirror system 7 is arranged so as to be opposed to the fluorescent screens which are front faces of the CRTs 1A, 1B, 1C. The mirror system 7 is adapted to project light beams from the three CRTs 1A, 1B, 1C in a +Z direction, and includes three dichroic mirrors (not shown) each having a wavelength selecting property corresponding to each color of the light beams. Indicated at 8 is a common projection lens arranged on an optical path of the reflected light beam from the mirror system 7.

Figure 6:
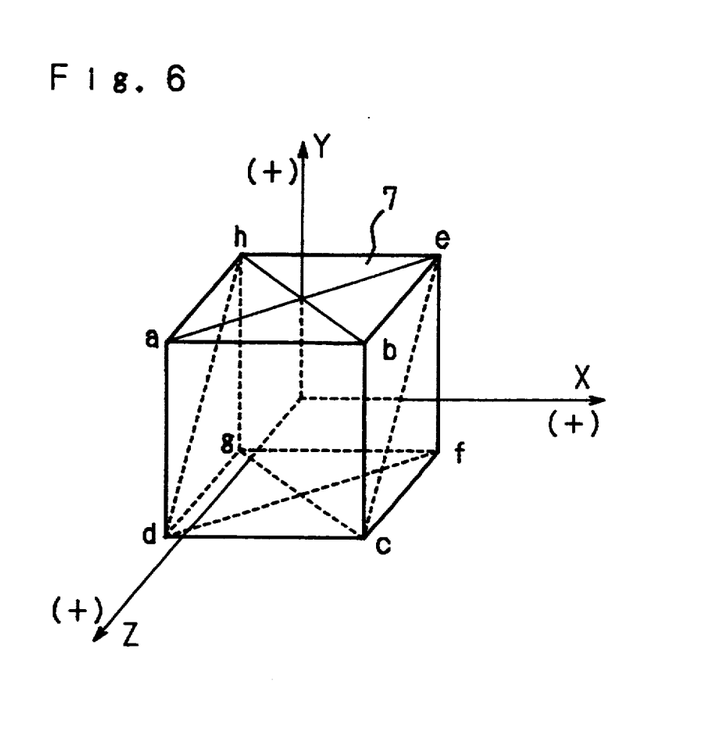
FIG. 6 is a conceptual diagram showing-a mirror system in the projector shown in FIG. 5.

FIG. 6 shows a concept of the mirror system 7. In this figure, the mirror system 7 is in a cubic form for the sake of convenience, and symbols a to h are designated to corners of the cubic. Planes parallel with the X-Y plane are the (a-b-c-d) and (e-f-g-h) planes. Let it be assumed that a reflection plane for the light beam from the CRT 1A is the (a-e-f-d) plane, a reflection plane for the light beam from the CRT 1B is the (b-c-g-h) plane, and a reflection plane for the light beam from the CRT 1C is the (c-e-h-d) plane. More specifically, the orientations of the above reflection planes are expressed with reference to the X, Y and Z coordinate axes as (101) respectively, (011), (101) when a symbolic method of mirror is used and +Z direction is an emitting direction (001) of the light beam.

An operation of the thus constructed projector will be described next. The color light beams from the three CRTs 1A, 1B, 1C are incident upon the mirror system 7 respectively from the +X direction, −X direction, and +Y direction. Specifically, the light beam from the CRT 1A is reflected by the (a-e-f-d) plane of the dichroic mirror of the mirror system 7; the light beam from the CRT 1B is reflected by the (b-c-g-h) plane of the dichroic mirror of the mirror system 7; and the light beam from the CRT 1C is reflected by the (c-e-h-d) plane of the dichroic mirror of the mirror system 7.

In this example, since the respective tube axes of the three CRTs 1A, 1B, 1C are positioned on the X-Y plane, a depth D2 is smaller than the depths of the conventional projectors shown in FIGS. 3 and 4, thereby making an overall size of the projector smaller. In addition, the use of the mirror system 7 including the dichroic mirrors eliminates the difference in the length of the optical paths of the light beams, thereby obviating the need for an optical path correcting lens or the like. Further, the use of the dichroic mirrors allows the light beams of the respective colors to be emitted through a single projection lens 8. This facilitates coinciding of the optical axes of the three light beams and eliminates a color difference caused by a displacement of the light beam from the optical axis according to the color.

Figure 7:
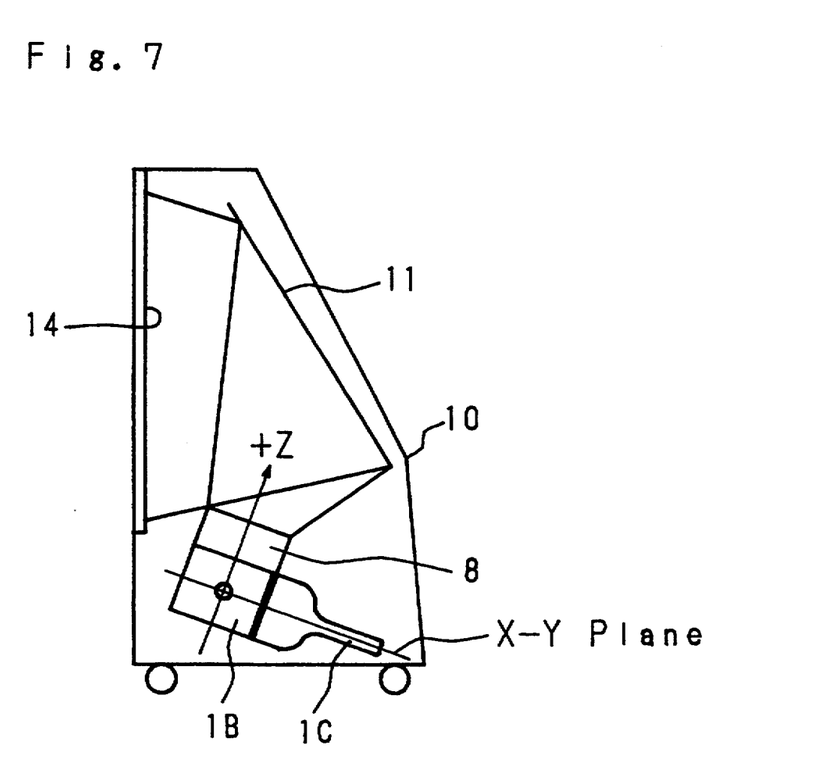
FIG. 7 is a schematic construction diagram showing another embodiment of the invention.

While description is given on the example in which the invention is applied to the front type projector, the invention is also applicable to a rear type projector. In this case, the light beams from the mirror system 7 are emitted upward, i.e. in a direction along the z-axis, so as to obtain a sufficient projection distance, and are reflected by another mirror so as to be projected onto a rear type screen. An exemplary construction of this case is shown in FIG. 7. In FIG. 7, indicated at 10 is a container unit. On one side face of the container unit 10 is fixedly arranged a rear type screen 14. In the container unit 10 is arranged another mirror 11 for reflecting the projected light from the projection lens 8 onto the screen 14.

Since a depth of the projector is a dimension H in the Y direction in the case where the invention is applied to the rear type projector, it is desirable to use the CRT 1C having a short axis. If not green color having a high visibility but a red or blue color is selected as a luminescent color of the CRT 1C, the axial length of the CRT 1C can be shortened.

Figure 8:
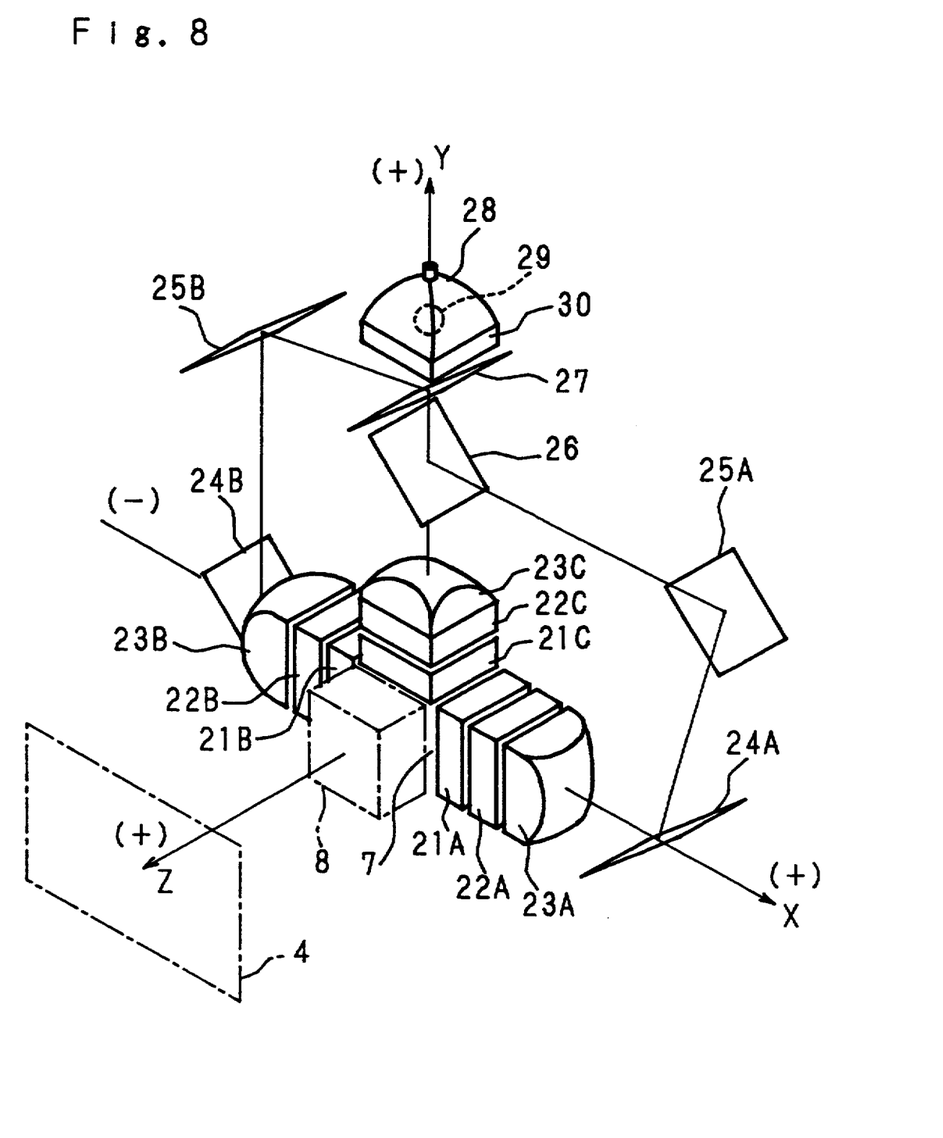
FIG. 8 is a schematic construction diagram showing still another embodiment of the invention.

Further, although the CRTs are used as a means for forming video images in the foregoing embodiment, liquid crystal displays may be used in place of the CRTs. In this case, the depth of the projector can be shortened further. FIG. 8, is a schematic construction diagram showing a projector according to the invention in the case where the liquid crystal displays are used.

In FIG. 8, indicated at 21A, 21B, 21C are liquid crystal units, at 22A, 22B, 22C liquid crystal panels, at 23A, 23B, 23C condenser lenses, at 24A, 24B, 25A, 25B reflection mirrors, at 26, 27 dichroic mirrors, at 28 a dichroic reflector, at 29 a metal halide lamp, and at 30 a UV filter.

The blue component from the metal halide lamp 29 is reflected by the dichroic mirror 27, further reflected by the reflection mirrors 25B, 24B, and transmitted through the condenser lens 23B, the liquid crystal panel 22B, and the liquid crystal unit 21B so as to be incident upon the mirror system 7. The red component from the metal halide lamp 29 passes through the dichroic mirror 27, is reflected by the dichroic mirror 26, is further reflected by the reflection mirrors 25A, 24A, and transmitted through the condenser lens 23A, the liquid crystal panel 22A and the liquid crystal unit 21A so as to be incident upon the mirror system 7. The green component from the metal halide lamp 29 passes through the dichroic mirrors 27, 26; and transmits through the condenser lens 23C, the liquid crystal panel 22C and the liquid crystal unit 21C so as to be incident upon the mirror system 7. Consequently, each color component beam from the mirror system 7 is projected onto the screen 4: through the projection lens 8.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A projector for projecting a video image onto a screen, comprising:

three cathode ray tubes radiating light beams of colors different from one another and arranged such that respective tube axes thereof exist in one plane;

first mirror means arranged at front sides of said cathode ray tubes, for reflecting light beams of the respective colors from said cathode ray tubes in a direction perpendicular to said one plane; and a projection lens, arranged on an optical path of the reflected light beam from said first mirror means, for combining the reflected light beams of the respective colors and projecting the combined light beam onto the screen.

2. A projector according to claim 1 wherein the screen is a front projection type screen.

3. A projector according to claim 1, further comprising second mirror means for reflecting the combined light beam from said projection lens, before the combined light beam from said projection lens is projected onto the screen.

4. A projector according to claim 3 wherein the screen is a rear projection type screen.

5. A projector according to claim 1 wherein the tube axes of said three cathode ray tubes extend in +X direction, −X direction, and +Y direction, and the light beam is emitted from said projection lens in +Z direction.

6. A projector according to claim 5 wherein said mirror means includes reflection surfaces having orientations of (101), (011), and (101) for said three cathode ray tubes when expressed with reference to X, Y and Z coordinate axes and a beam emitting direction from said projection lens is assumed as (001).

7. A projector for projecting a video image onto a screen, comprising:
three liquid crystal displays radiating light beams of colors different from one another and arranged such that respective optical axes thereof exist on the same plane;
mirror means, arranged at front sides of said liquid crystal displays, for reflecting light beams of the respective colors from said liquid crystal displays in a direction perpendicular to said plane; and
a projection lens, arranged on an optical path of the reflected beam from said mirror means, for combining the reflected light beams of the respective colors and projecting the combined light beam onto the screen.

8. A projector for projecting a video image onto a screen, comprising:
three projectors for projecting first, second and third light beams along first, second and third axes, respectively, wherein said first, second and third axes lie in a common plane;
mirror means arranged in front of said projectors for reflecting said first, second and third light beams onto a common fourth axis which is perpendicular to said plane; and
projection means for projecting the reflected light beam from said mirror means onto a screen.

9. A projector as in claim 8, wherein said projectors are cathode ray tubes.

10. A projector as in claim 8, wherein said projectors are liquid crystal devices.

11. A projector as in claim 8, wherein said first, second and third light beams are of respectively different colors.

12. A projector as in claim 8, wherein said mirror means comprises reflection surfaces associated with said first, second and third projectors.

13. A projector as in claim 11, wherein said mirror means comprises dichroic mirrors associated with said first, second and third projectors.

14. The projector of claim 1, wherein said mirror means and said projector lens ensure that optical paths of said cathode ray tubes are correctly oriented.

* * * * *